United States Patent [19]
Manev et al.

[11] Patent Number: 5,792,442
[45] Date of Patent: Aug. 11, 1998

[54] HIGHLY HOMOGENEOUS SPINEL $Li_{1+x}Mn_{2-x}O_4$ INTERCALATION COMPOUNDS AND METHOD FOR PREPARING SAME

[75] Inventors: Vesselin Manev; Titus Faulkner, both of Gastonia, N.C.

[73] Assignee: FMC Corporation, Philadelphia, Pa.

[21] Appl. No.: 665,396

[22] Filed: Jun. 18, 1996

Related U.S. Application Data

[60] Provisional application No. 60/007,997, Dec. 5, 1995.
[51] Int. Cl.⁶ .......................... C01G 45/12; H01M 4/50
[52] U.S. Cl. ............................................ 423/599; 429/224
[58] Field of Search ............................. 423/599, 605, 423/641; 429/224

[56] References Cited

U.S. PATENT DOCUMENTS

| | | |
|---|---|---|
| 4,246,253 | 1/1981 | Hunter . |
| 4,246,324 | 1/1981 | de Nora et al. . |
| 4,312,930 | 1/1982 | Hunter . |
| 4,366,215 | 12/1982 | Coetzer et al. . |
| 4,448,856 | 5/1984 | Zuckerbrod et al. . |
| 4,507,371 | 3/1985 | Thackeray et al. . |
| 4,546,058 | 10/1985 | Charkey et al. . |
| 4,599,157 | 7/1986 | Suzuki et al. . |
| 4,731,309 | 3/1988 | Hoffman . |
| 4,732,741 | 3/1988 | Duncan et al. . |
| 4,749,634 | 6/1988 | Sammells . |
| 4,828,834 | 5/1989 | Nagaura et al. . |
| 4,946,664 | 8/1990 | Van Zyl et al. . |
| 4,956,247 | 9/1990 | Miyazaki et al. . |
| 4,975,346 | 12/1990 | Lecerf et al. . |
| 5,023,155 | 6/1991 | Charkey et al. . |
| 5,030,523 | 7/1991 | Neat et al. . |
| 5,110,696 | 5/1992 | Shokoohi et al. . |
| 5,135,732 | 8/1992 | Barboux et al. . |
| 5,153,081 | 10/1992 | Thackeray et al. . |
| 5,166,012 | 11/1992 | Roussouw et al. . |
| 5,169,736 | 12/1992 | Bittihn et al. . |
| 5,192,629 | 3/1993 | Guyomard et al. . |
| 5,196,278 | 3/1993 | Idota . |
| 5,211,933 | 5/1993 | Barboux et al. . |
| 5,240,794 | 8/1993 | Thackeray et al. . |
| 5,244,757 | 9/1993 | Takami et al. . |
| 5,266,299 | 11/1993 | Tarascon .................. 423/599 |
| 5,288,474 | 2/1994 | Reichert et al. ............ 423/599 X |
| 5,290,592 | 3/1994 | Izuchi et al. . |
| 5,312,611 | 5/1994 | Takami et al. . |
| 5,316,875 | 5/1994 | Murai et al. . |
| 5,389,467 | 2/1995 | Herr et al. . |
| 5,415,957 | 5/1995 | Okada et al. . |
| 5,425,932 | 6/1995 | Tarascon . |
| 5,429,890 | 7/1995 | Pynenburg et al. . |
| 5,443,929 | 8/1995 | Yamamoto et al. . |
| 5,449,577 | 9/1995 | Dahn et al. . |
| 5,462,820 | 10/1995 | Tanaka . |
| 5,474,959 | 12/1995 | Schäfer et al. . |
| 5,478,671 | 12/1995 | Idota . |
| 5,478,672 | 12/1995 | Mitate . |
| 5,478,673 | 12/1995 | Funatsu . |
| 5,478,675 | 12/1995 | Nagaura . |
| 5,478,676 | 12/1995 | Turi et al. . |
| 5,487,960 | 1/1996 | Tanaka . |
| 5,489,492 | 2/1996 | Asami et al. . |
| 5,494,762 | 2/1996 | Isoyama et al. . |
| 5,496,664 | 3/1996 | Sterr . |
| 5,506,077 | 4/1996 | Koksbang . |
| 5,601,952 | 2/1997 | Dasgupta et al. ............ 429/224 |

FOREIGN PATENT DOCUMENTS

| | | |
|---|---|---|
| PCT/US95/ 13106 | 10/1995 | WIPO . |

OTHER PUBLICATIONS

Lithium Insertion into Manganese Spinels. M.M. Thackeray, et al.; *Mater. Res. Bull.*, vol. 18, (1983) pp. 461–472. No month.

Improved Capacity Retention in Rechargeable 4 V Lithium/ Lithium–Manganese Oxide (Spinel) Cells; Gummow et al.; *Solid State Ionics* 69 (1994). No Month.

Crystallographic And Magnetic Properties Of Several Spinels Containing Trivalent JA–1044 Manganese; D.G. Wickham and W.J. Croft; *J. Phys. Chem. Solids*, vol. 7, (1958) pp. 351–360. No Month.

Rechargeable Lithium Battery With Spinel–Related $\lambda$–$MnO_2$; I. Synthesis of $\lambda$–$MnO_2$ for Battery Applications; *Journal of Power Sources*, 43–44 (1993) pp. 551–559. No Month.

Rechargeable Lithium Battery With Spinel–Related $MnO_2$; II. Optimization of the $LiMn_2O_4$ Synthesis Conditions; Momchilov et al.; *Journal of Power Sources*, 41 (1993) pp. 305–314. No month.

The Chemistry Of $LiMn_2O_4$ Formation; W. F. Howard, Jr. No Date.

Rechargeable Lithium Battery With Spinel–Related $\lambda$–$MnO_2$; Part III. Scaling–Up Problems Associated With $LiMn_2O_4$ Synthesis; V. Manev et al.; *Journal of Power Sources*, (1995) pp. 1–6. No Month.

*Primary Examiner*—Anthony Skapars
*Attorney, Agent, or Firm*—Bell, Seltzer, Park & Gibson, P.A.

[57] ABSTRACT

A novel method of preparing a spinel $Li_{1+x}Mn_{2-x}O_4$ intercalation compound with low lattice distortion and a highly ordered and homogeneous structure for 4 V secondary lithium and lithium ion cells is provided. The method of preparing the spinel $Li_{1+x}Mn_{2-x}O_4$ intercalation compound comprises mixing at least one manganese compound with at least one lithium compound and firing the mixture at three different temperature ranges with corresponding gas flow rates to form the spinel $Li_{1+x}Mn_{2-x}O_4$ intercalation compounds. The spinel $Li_{1+x}Mn_{2-x}O_4$ intercalation compounds have a mean X value of between about 0.01 and 0.05 and a full width at half maximum of the x-ray diffraction peaks at a diffraction angle $2\theta$ of planes (400) and (440) using $CuK\alpha_1$ rays of between about 0.10° and 0.15°. The spinel $Li_{1+x}Mn_{2-x}O_4$ intercalation compounds may be used in the positive electrodes of secondary lithium and lithium ion cells to provide cells having high specific capacities and long cycling lives.

27 Claims, 4 Drawing Sheets

HIGHLY HOMOGENEOUS SPINEL $LI_{1+x}MN_{2-x}O_4$ INTERCALATION COMPOUNDS AND METHOD FOR PREPARING SAME

CROSS-REFERENCE TO RELATED APPLICATIONS

This application is related to commonly owned co-pending provisional application Ser. No. 60/007997 filed Dec. 5, 1995, and claims the benefit of its earlier filing date under 35 U.S.C. § 119(e).

FIELD OF THE INVENTION

This invention relates to spinel $Li_{1+x}Mn_{2-x}O_4$ intercalation compounds, and particularly to the use of spinel $Li_{1+x}Mn_{2-x}O_4$ intercalation compounds in 4 V secondary lithium and lithium ion batteries.

BACKGROUND OF THE INVENTION

Heretofore, lithium intercalation compounds such as $LiMn_2O_4$ have been used in positive electrodes for 4 V secondary lithium and lithium ion batteries. The spinel $LiMn_2O_4$ intercalation compound was first obtained by Wickham and Croft by heating lithium carbonate and manganese oxide in 1:2 lithium to manganese molar ratio. D. G. Wickham and W. J. Croft, *J. Phys. Chem. Solids*, 7, 351 (1958). Wickham and Croft also reported that using an excess of lithium in the reaction mixture led to formation of $Li_2MnO_3$, while an excess of manganese led to a mixture containing $Mn_2O_3$. These two compounds are intermediate products of the solid state chemical reactions which take place during the high temperature spinel synthesis of the spinel $LiMn_2O_4$ and can be present at any time when the reactions are not fully completed. W. Howard, *Ext. Abstr.*, 7 IMLB, 281 (Boston, 1994).

As demonstrated in U.S. Pat. No. 4,426,253 to Hunter, the acid treatment of $LiMn_2O_4$ forms a $\lambda$-$MnO_2$ which can be used in a positive electrode for electrochemical power sources. It was later discovered that the spinel $LiMn_2O_4$ could be used as the positive electrode for a secondary lithium cell. Thackery et al., *Material Research Bulletin*, 18, 461 (1983). Thackery et al. demonstrated that the potential-composition curves have two reversible plateaus, respectively at 4 and 2.8 V versus a lithium electrode.

The effect of synthesis temperature on the electrochemical performance of the secondary lithium cell using the 2.8 V plateau of spinel $LiMn_2O_4$ has been described in, e.g., U.S. Pat. No. 4,828,834 to Nagaura et al. Nagaura et al. determined that an optimal synthesis temperature for $LiMn_2O_4$ using lithium carbonate and manganese dioxide is in the range of between 430°–520° C. Using the 2.8 V charge-discharge plateau, Nagaura et al. also determined that $LiMn_2O_4$ compounds having a full width at half maximum between 1.1° and 2.1° of a peak 2$\theta$ equal to 46.1° by x-ray diffraction analysis using FeK$\alpha$ rays possess favorable cycling performance when used as the active material in cathodes for secondary lithium cells. Furthermore, Nagaura et al. teaches that spinels having a full width at half maximum less than 1.1° do not possess the desired discharging capacity.

Recently, the effect of the higher synthesis temperature on the reversible capacity of the 4 V plateau was described. V. Manev et al., *J. Power Sources*, 43–44, 551 (1993) and U.S. Pat. No. 5,211,933 to Barboux et al. Manev et al. determined that the synthesis of spinel $LiMn_2O_4$ for secondary lithium cells should be performed at temperatures lower than 750° C. Barboux et al. stated that low temperature processes between 200° and 600° C. yield finer size particles of $LiMn_2O_4$, do not affect the capacity of the electrolytic cells, and enhance the cycling behavior of the spinel. The decrease in the capacity associated with the increase in the synthesis temperature at temperatures higher than 800° C. was explained by a significant oxygen loss at temperatures higher than 800° C. Manev et al., *J. Power Sources*, 43–44, 551(1993).

In U.S. Pat. No. 5,425,932 to Tarascon, a different approach for employing synthesis temperatures greater than 800° C. was described which involves an additional slow cooling step with a cooling rate slower than 10° C./h in order to form a spinel with increased cell capacity. Even though this method may increase the capacity of the cell, it may be the source of considerable nonhomogeneous oxygen distribution in the final product, because the oxygen content is a function of firing temperature. For example, the oxygen content in the bulk may be lower than stoichiometric, while an oxygen rich spinel may form on the surface of the particles.

As described in R. J. Gummow et al. *Solid State Ionics*, 69,59(1994)), an infinite number of high lithium content stoichiometric spinel phases exist with a general formula $Li_{1+X}Mn_{2-X}O_4$ where ($0 \leq X \leq 0.33$). Gummow et al. also states that an infinite series of oxygen rich defect spinel phases exist with a general formula $LiMn_2O_{4+Y}$ where ($0 \leq Y \leq 0.5$) The possibility that X and Y may have negative values has been described for the ranges $-0.1 \leq X \leq 0$ for $Li_XMn_2O_4$ in U.S. Pat. No. 5,425,932 to Tarascon and $-0.1 \leq Y \leq 0$ for $LiMn_2O_{4+Y}$ in V. Manev et al.. *J. Power Sources*, 43–44,551 (1993)). As suggested by Gummow et al. and U.S. Pat. No. 5,425,932 to Tarascon et al., the variation of the lithium and oxygen content are accompanied by considerable variation of the spinel lattice parameters.

The existence of an infinite number of lithium manganese spinel phases and the existence of intermediate compounds, thermodynamically stable in the temperature range of spinel preparation but inactive in the 4 V discharge range, namely $Li_2MnO_3$ and $Mn_2O_3$ demonstrate that the preparation of highly homogenous spinel compounds is extremely complicated. However, a highly homogenous compound is desirable for positive electrodes of secondary lithium cells to provide high specific capacity and a negligible capacity fade as a function of the number of charge-discharge cycles.

SUMMARY OF THE INVENTION

The present invention provides a method of preparing a spinel $Li_{1+x}Mn_{2-x}O_4$ intercalation compound with low lattice distortion and a highly ordered and homogeneous structure for 4 V secondary lithium and lithium ion cells having high specific capacity and long cycling life.

The method of preparing a spinel $Li_{1+x}Mn_{2-x}O_4$ intercalation compound comprises mixing at least one manganese compound with at least one lithium compound and firing the mixture at a temperature of between about 400° C. and 500° C. for at least about four hours in the presence of a gas with a gas flow rate in the range of between about 0.5 l/gh and 5.0 l/gh to form an oxygen rich spinel. The oxygen rich spinel is fired at a temperature of between 500° C. and 600° C. for at least about ten hours in the presence of gas flow with a flow rate of between about 0.1 l/gh and 1.0 l/gh to form a distorted stoichiometric $Li_{1+x}Mn_{2-x}O_4$ spinel. The distorted stoichiometric spinel is then fired at a temperature between 700° C. and 800° C. for at least about ten hours in the presence of a gas flow with a gas flow rate of between about 0.005 l/gh and 0.2 l/gh to form an ordered stoichiometric $Li_{1+x}Mn_{2-x}O_4$ spinel. The spinel is subsequently cooled at a rate of at least 20° C. an hour at a flow rate of between 0 l/gh and 1.0 l/gh.

The spinel $Li_{1+x}Mn_{2-x}O_4$ intercalation compound prepared according to the present invention has a mean X value of between about 0.01 and 0.05 and a full width at half maximum of the x-ray diffraction peaks at a diffraction angle 2θ of planes (400) and (440) using $CuK\alpha_1$ rays of between about 0.10° and 0.15°. The mean crystallite size of the spinel $Li_{1+x}Mn_{2-x}O_4$ intercalation compounds is between about 3,000 to 30,000 angstroms. The highly ordered and homogeneous spinel $Li_{1+x}Mn_{2-x}O_4$ intercalation compounds may be used in the positive electrodes of secondary lithium and lithium ion cells to provide cells having high specific capacity and long cycling life.

These and other features and advantages of the present invention will become more readily apparent to those skilled in the art upon consideration of the following detailed description and accompanying drawings which describe both the preferred and alternative embodiments of the present invention.

DETAILED DESCRIPTION OF THE INVENTION

According to the method of the present invention, a low crystal lattice distortion spinel intercalation compound with a general formula $Li_{1+x}Mn_{2-x}O_4$ is prepared from a starting mixture which includes at least one manganese compound and at least one lithium compound. The at least one manganese compound is selected from the group consisting of manganese salts and manganese oxides. Exemplary manganese salts and oxides include $MnO_2$, $Mn_2O_3$, $Mn_3O_4$, $MnCO_3$, $MnSO_4$, $Mn(NO_3)_2$, $Mn(CH_3CO_2)_2$, and mixtures thereof. The at least one lithium compound is selected from the group consisting of lithium salts and lithium oxides. Exemplary lithium salts and oxides include $Li_2O$, $LiOH$, $LiNO_3$, $Li_2CO_3$, $Li_2SO_4$, $LiNO_3$, $LiCH_3CO_2$, and mixtures thereof. The at least one manganese compound and at least one lithium compound are mixed in a lithium to manganese mole ratio of between about 1.02:2 and 1.1:2.

In order to form this spinel $Li_{1+x}Mn_{2-x}O_4$ intercalation compound, the mixture is initially fired at a temperature range of between about 400° C. and 500° C., preferably about 450° C., in the presence of a gas flow with a flow rate between about 0.5 l/gh and 5.0 l/gh. The gas used in the gas flow is preferably air or a gas mixture having an oxygen content of between about 5 and 100% oxygen by volume. During this firing step, a predominantly high oxygen content spinel $Li_{1+x}Mn_{2-x}O_4$ is produced. A high gas flow rate is maintained in order to lead away from the reaction mixture inert gases and vapors such as $H_2O$, $CO_2$ and $NO_2$ generally generated from the manganese and lithium compounds and to deliver oxygen to the spinel in order to avoid formation of $Mn_3O_4$ and $LiMnO_2$. The temperature of the initial firing step is maintained for a soak time of at least about 4 hours, and preferably for at least about 10 hours, to form the oxygen rich spinel. Once the initial firing step is concluded, the oxygen rich spinel material may be allowed to cool prior to any subsequent firing steps.

The oxygen rich spinel is subsequently fired at a temperature of between about 500° C. and 600° C., preferably between about 550° C. and 600° C., in the presence of a gas flow of between about 0.1 l/gh and 1.0 l/gh. The gas used is preferably air or a gas mixture containing oxygen as described above. A comparatively high gas flow rate is maintained in the second firing step to avoid the reduction processes which can be caused by inert gas evolution from unreacted raw materials during the first firing or from intermediate products. During the second firing, a spinel compound nearly stoichiometric with respect to oxygen and with considerably disordered structures is produced. The temperature of the second firing step is maintained for a soak time of at least about 10 hours, and preferably at least about 48 hours. Once the second firing step is concluded, the x-ray diffraction pattern of the intermediate product, i.e., the distorted $Li_{1+x}Mn_{2-x}O_4$ spinel, is characteristic of a typical spinel with no traces or reflections corresponding to other phases, but with broad peaks. After the second firing step is finished, the distorted spinel may be allowed to cool prior to subsequent firing steps.

The distorted $Li_{1+x}Mn_{2-x}O_4$ spinel is subsequently subjected to a third firing step at a temperature of between about 700° C. and 800° C., preferably between about 700° C. and 750° C., and in the presence of a gas flow at a flow rate of between about 0.005 l/gh and 0.2 l/gh. The gas used in the gas flow is preferably air or a gas mixture containing oxygen as described above. During the third firing step, the temperature range and gas flow rate is sufficiently high to deliver oxygen for oxidation of the intermediate products, e.g., $Mn_2O_3$ and $LiMnO_2$, formed in the prior firing steps and present although possibly undetected by x-ray diffraction analysis. Nevertheless, the temperature range and gas flow rate are low enough to prevent loss of a considerable amount of lithium from the reaction mixture and to prevent the formation of a lithium concentration gradient between the surface and the bulk of the spinel particles. Once the third firing step is completed, an ordered stoichiometric $Li_{1+x}Mn_{2-x}O_4$ spinel is produced. The temperature of the third firing step is maintained for a soak time of preferably at least about 10 hours, and preferably at least about 24 hours.

At the conclusion of the third firing step, the mixture is allowed to cool at a rate of greater than about 20° C. per hour and preferably greater than about 50° C. per hour with a gas flow rate of between about 0.0 and 1.0 l/gh. As described above with respect to the firing steps, the gas flow used during cooling can be air or a gas mixture containing oxygen.

Alternatively, the firing steps of the method described above may include changes in the temperature and the gas flow rate within the described ranges. In other words, the temperature and/or gas flow rate may be increased or decreased within their respective ranges during the firing steps. Additionally, the gas delivered to the spinel during the firing steps may also vary in oxygen content and gases used during the firing steps may be changed. Although the firing temperatures are preferably maintained for the soak times described above, longer soak times tend to provide an improved spinel compound. Nevertheless, the soak times are typically dictated by commercial feasibility and extremely long soak times may not be desired. As described above, the spinel material may be allowed to cool between firing steps; but for reasons of efficiency, the firing steps are preferably performed consecutively without cooling of the spinel material.

The spinel $Li_{1+x}Mn_{2-x}O_4$ intercalation compounds prepared according to the present invention possess improved properties over conventional $Li_{1+x}Mn_{2-x}O_4$ spinels. The spinel $Li_{1+x}Mn_{2-x}O_4$ of the invention is a highly ordered and homogeneous structure having a high specific capacity. The improved physicochemical and electrochemical properties of the $Li_{1+x}Mn_{2-x}O_4$ spinels of the invention are independent of the nature of the manganese compounds and lithium compounds used to form the spinel. The $Li_{1+x}Mn_{2-x}O_4$ spinels prepared according to the present invention have a mean X value of between about 0.01 and 0.05. The relatively small range of mean X values provides a spinel which exhibits a high initial capacity. In addition, the $Li_{1+x}Mn_{2-x}O_4$ spinels of the present invention exhibit a full width at half maximum of the x-ray diffraction peaks at a diffraction angle 2θ of planes (400) and (440) using $CuK\alpha_1$ rays of between about 0.10° and 0.15°. Spinel $Li_{1+x}Mn_{2-x}O_4$ intercalation compounds having lower widths at half maximum have correspondingly lower random lattice distortion and narrower distribution of lithium/manganese ratios. When spinel $Li_{1+x}Mn_{2-x}O_4$ intercalation compounds having widths at half maximum in this range are used in the positive electrode of rechargeable lithium cells, the decrease in the specific capacity during cycling is negligible and thus the lithium cells exhibit long cycling lives. The mean crystallite size of the spinels of the invention is between about 3,000 and 30,000 angstroms.

The spinel $Li_{1+x}Mn_{2-x}O_4$ compounds may be used in positive electrodes in electrochemical cells. The $Li_{1+x}Mn_{2-x}O_4$ spinel material is typically combined with a conductive agent such as graphite or carbon black and a binder material such as polyvinylidene difluoride (PVDF) and dispersed in a solvent such as n-methyl pyrrolidinone (NMP) (e.g. 1-methyl-2-pyrrolidinone) to form a slurry. The slurry is typically spread on aluminum and then heated to evaporate the solvent to form a dry electrode material. The dry electrode is then compressed by rolling, pressing, or other known methods, and cut into, for example, a disk, to form the positive electrode. The electrode is then placed inside an electrochemical cell with a lithium counterelectrode and an electrolyte such as $EC:DMC/LiPF_6$.

The present invention will be further illustrated by the following nonlimiting examples.

As used in these examples, the term "crystallite size" is defined with the presumption that all the crystallites are equivalent and have a cubic shape, using the following formula:

$$L=6/\rho A$$

wherein L is the crystallite length size, ρ is spinel density and A is the specific surface area measured by the BET method. Single point BET measurements were determined using a Quantachrome Monosorb BET instrument.

The planar spacing based on the (400) reflection peaks is calculated using the Bragg equation:

$$d=\lambda/2 \sin \theta$$

wherein λ=1.54056Å and is the wavelength of $CuK\alpha_1$ radiation.

The lattice parameter a, corresponding to the plane (400) is calculated using the following formula:

$$a^2=(i^2+j^2+k^2)d^2$$

where i, j, and k are the Miller indexes.

EXAMPLE 1

Figure 1:
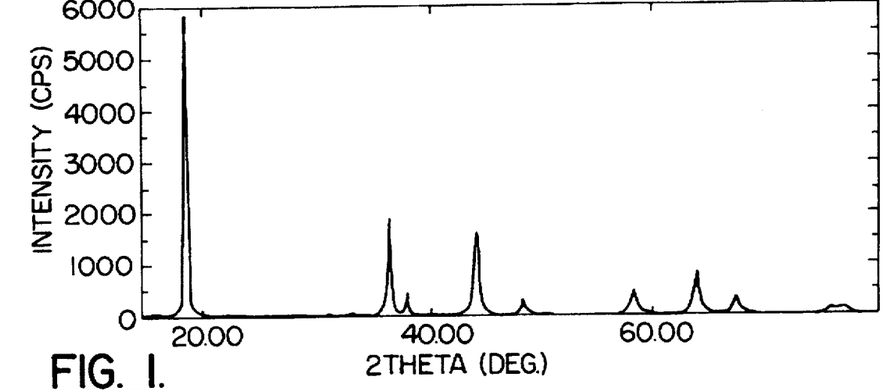
FIG. 1 is an x-ray diffraction profile with $CuK\alpha_1$ rays in the range of 15<2θ<80 for a distorted stoichiometric spinel formed after the second firing step in accordance with the present invention.
Figure 2:
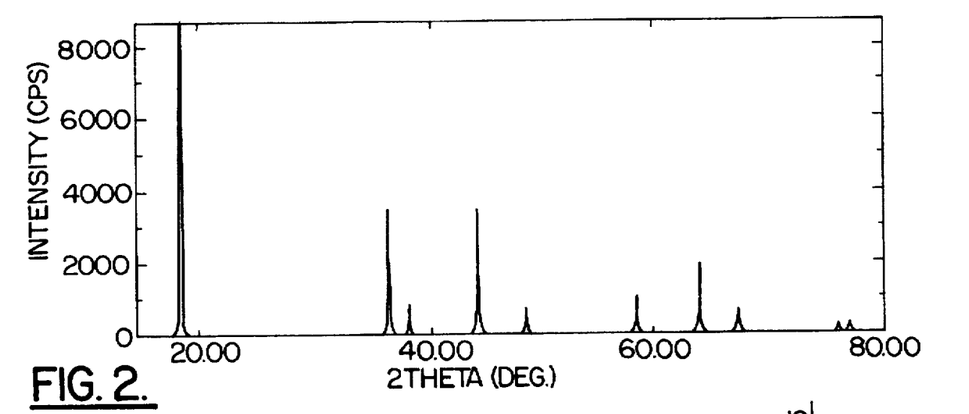
FIG. 2 is an x-ray diffraction profile with $CuK\alpha_1$ rays in the range of 15<2θ<80 for an ordered stoichiometric spinel $Li_{1+x}Mn_{2-x}O_2$ compound formed according to the present invention.
Figure 3:
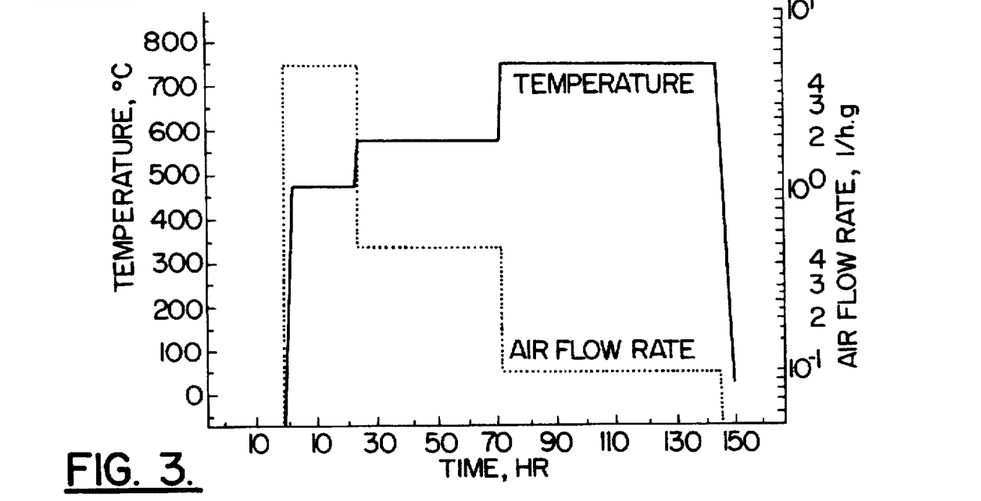
FIG. 3 is a diagram showing temperature and gas flow rate values as a function of synthesis time according to the preferred method of preparing the spinel $Li_{1+x}Mn_{2-x}O_4$ of the invention.

A spinel $Li_{1+x}Mn_{2-x}O_4$ compound with mean X value of about 0.025 was prepared by heating together an intimate mixture of LiOH and $MnCO_3$ in a lithium/manganese mole ratio of 1.05:2. Initially, the mixture was fired for 24 h at about 450° C. with an air flow rate of 4 l/gh. Then, the reaction mixture was fired for 48 h at about 550° C., while the air flow rate was decreased and maintained at approximately 0.5 l/g.h. FIG. 1 illustrates the x-ray diffraction profile corresponding to $CuK\alpha_1$ rays in the range 15<2θ<80 of the intermediate product formed after the second firing at 550° C. FIG. 1 shows that after the second firing, a distorted but extremely pure spinel $Li_{1+x}Mn_{2-x}O_4$ phase is produced. The mixture was then fired at about 750° C. for 72 h, while the air flow rate was decreased and maintained at 0.1 l/g.h. The mixture was cooled at the rate 100° C. per hour, with zero air flow. The x-ray diffraction profile corresponding to $CuK\alpha_1$ rays in the range 15<2θ<80 of the spinel $Li_{1+x}Mn_{2-x}O_4$ compound formed is illustrated in FIG. 2. FIG. 3 is a diagram showing the temperature and air flow rate as a function of synthesis time for this example.

Figure 4A:
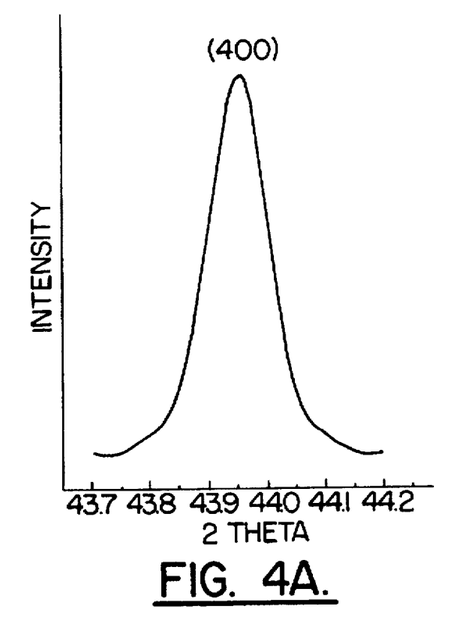
FIGS. 4A and 4B are x-ray diffraction profiles corresponding to $CuK\alpha_1$ rays of the (400) and (440) diffraction peaks of the spinel $Li_{1+x}Mn_{2-x}O_4$ intercalation compound of the present invention.
Figure 4B:
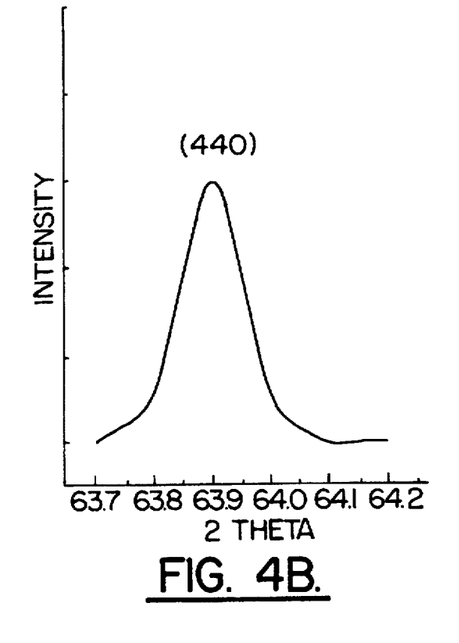

As illustrated in FIGS. 4A and 4B, the full width at half maximum of the x-ray diffraction peaks of planes (400) and (440) referring to $CuK\alpha_1$, rays for 2θ were 0.124 and 0.146 degrees, respectively. The specific surface area measured by BET was 3.1 m²/g and the mean crystallite size was about 4600 A.

The prepared spinel $Li_{1+0.025}Mn_{2-0.025}O_4$ compound was mixed with 10% graphite and 5% PVDF binder and dispersed in NMP solvent to form a slurry. The slurry was spread on Al foil and then heated to evaporate the NMP solvent. The dry electrode was then pressed at 500 kg/cm² and cut into a disk test sample electrode having a diameter of about 1 cm and a thickness of about 0.150 cm. The prepared test electrode was placed inside an electrochemical cell with a lithium counter electrode and with an EC:DMC/ LiPF$_6$ electrolyte. A charging-discharging test was conducted with a 1 h charge-discharge rate and 3–4.5 V voltage limits.

COMPARATIVE EXAMPLE 1

A spinel Li$_{1+x}$Mn$_{2-x}$O$_4$ compound with mean X value of about 0.025 was prepared by heating together an intimate mixture of LiOH and MnCO$_3$ in the same mole ratio (1.05:2) as Example 1. The mixture was fired once at a temperature of 750° C. for 72 h at an air flow rate of 1 l/g.h. The mixture was subsequently cooled at the rate of 100° C. per hour with zero air flow as in Example 1.

The full width at half maximum of the x-ray diffraction peaks of planes (400) and (440) referring to CuK$\alpha_1$ rays for 2θ were 0.308 and 0.374 degrees, respectively. The specific surface area measured by BET was 2.7 m$^2$/g and the mean crystallite size was about 5300 A.

The spinel Li$_{1+0.025}$Mn$_{2-0.025}$O$_4$ positive test electrode and electrochemical cell were prepared in the same manner as in Example 1. Additionally, the cell charge-discharge characteristics were measured under the same conditions as Example 1.

COMPARATIVE EXAMPLE 2

A spinel Li$_{1+x}$Mn$_{2-x}$O$_4$ compound with mean X value of about 0.025 was prepared by heating together an intimate mixture of LiOH and MnCO$_3$ in the same Li/Mn mole ratio (1.05:2) as Example 1. The mixture was fired in the same three consecutive temperature ranges and with the same duration as Example 1, but at a constant air flow rate of 1 l/gh. As in Example 1, the mixture was cooled at a rate of 100° C. per hour, with zero air flow.

The full width at half maximum of the x-ray diffraction peaks of planes (400) and (440) referring to CuK$\alpha_1$ rays for 2θ, were 0.216 and 0.262 degrees, respectively. The specific surface area measured by BET was 2.8 m$^2$/g and the mean crystallite size was about 5100 A.

The spinel Li$_{1+0.025}$Mn$_{2-0.025}$O$_4$ positive test electrode and electrochemical cell were prepared in the same manner as in Example 1. Additionally, the cell charge-discharge characteristics were measured under the same conditions as Example 1.

Figure 5:
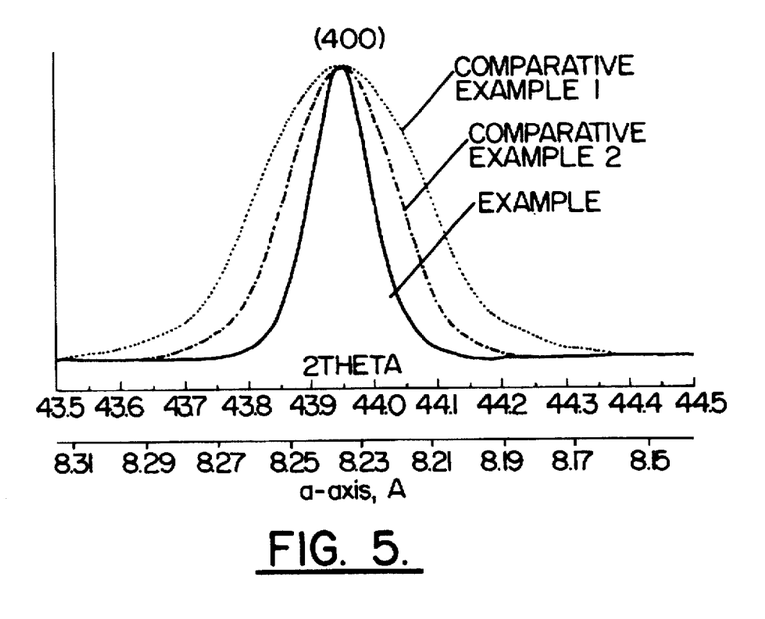
FIG. 5 is a graph illustrating the comparison between the x-ray diffraction profiles, corresponding to $CuK\alpha_1$ rays of the (400) reflection peaks, of the spinel $Li_{1+x}Mn_{2-x}O_4$ material of the present invention and comparative examples, displayed on the second x-axis as a function of lattice a-axis parameter of the unit cell.

FIG. 5 illustrates the comparison between the x-ray diffraction profiles referring to CuK$\alpha_1$ rays of (400) reflection peaks of spinel Li$_{1+x}$Mn$_{2-x}$O$_4$ materials of Example 1 and the Comparative Examples 1 and 2. For crystal compounds with a crystallite size higher than 3,000 angstroms such as those formed in Example 1 and Comparative Examples 1 and 2, x-ray divergence due to crystallite size does not take place in x-ray diffraction analysis which employs wavelengths of several angstroms. Thus, the different (400) plane profiles observed in FIG. 5 are based on the different degrees of lattice distortion. This is supported by the fact that the mean crystallite sizes of the spinels prepared according to Example 1 and Comparative Examples 1 and 2 are almost the same.

On the second x-axis of FIG. 5, the respective a-axis values for 2θ of the spinel unit cell in Å are shown. As shown in FIG. 5, the plane profiles correspond to the lattice distortion distribution and the a-axis distribution in the final product. The data presented in FIG. 5 demonstrates that in the conventionally prepared spinel, according to Comparative Examples 1 and 2, numerous phases in which a-axis value may vary in the range of 0.05–0.1 angstroms can simultaneously coexist. This distortion causes permanent internal stress in the crystallites and can be a source of fast crystallite deterioration during cycling when additional changes of the lattice parameters take place.

Figure 6:
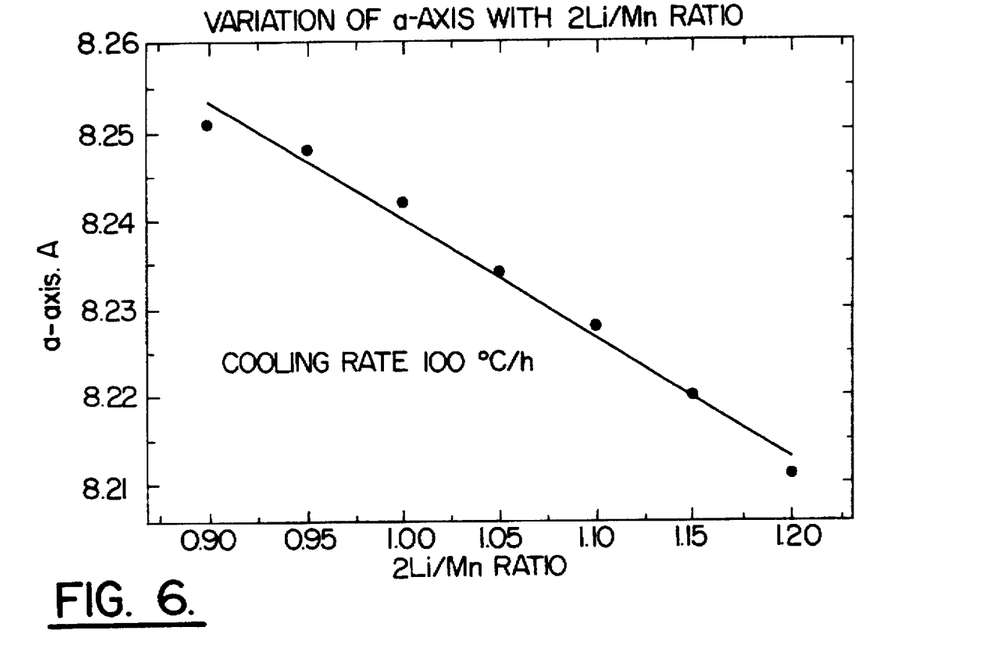
FIG. 6 is a graph trace showing the variation of the a-axis of the unit cell parameters versus the lithium/manganese ratio of the spinel $Li_{1+x}Mn_{2-x}O_4$ of the present invention at a cooling rate 100° C./h.
Figure 7:
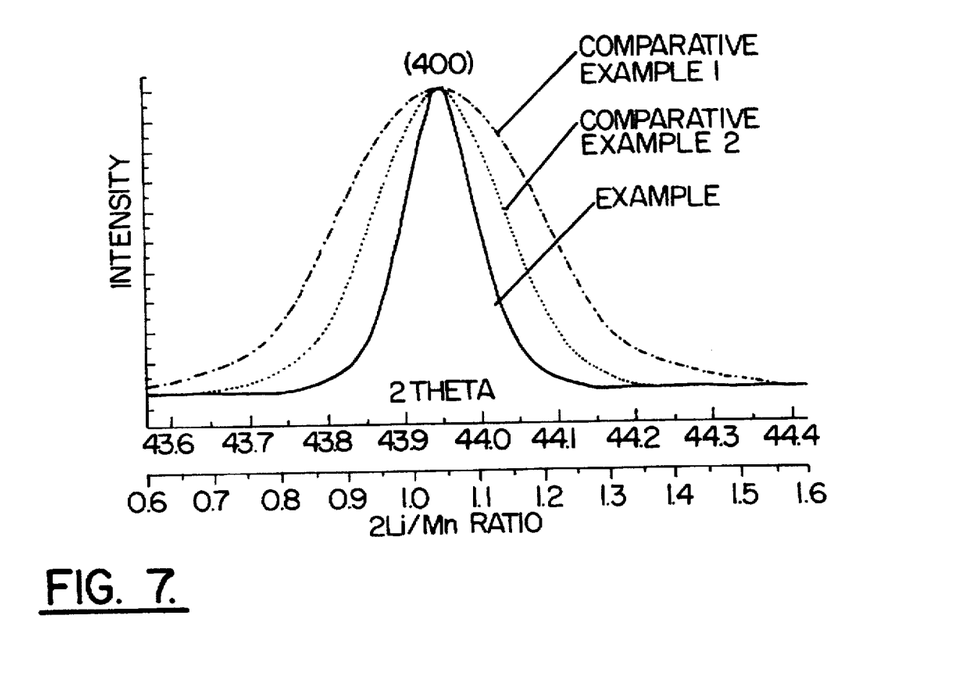
FIG. 7 is a graph illustrating the comparison between the x-ray diffraction profiles corresponding to $CuK\alpha_1$ rays of (400) reflection peaks, of spinel $Li_{1+x}Mn_{2-x}O_4$ of the present invention and comparative examples, displayed on the second x-axis as a function of the 2Li/Mn ratio.

FIG. 6 is a graph trace showing the variation of the a-axis of the unit cell parameters corresponding to the mean lithium/manganese ratio in the Li$_{1+x}$M$_{2-x}$O$_4$ compounds at a cooling rate of 100° C./h. The values in FIGS. 5 and 6 provide the relationship between the lithium/manganese ratio and the value of 2θ shown in FIG. 7. In FIG. 7, the second x-axis illustrates the variation of the lithium/ manganese ratio as it corresponds to the value of 2θ under the assumption that the lattice distortion is caused only by the random distribution of the lithium-manganese ratio in the spinel compound. Based on this assumption, which may be true at a fixed oxygen content in the compound, the (400) reflection peak will correspond to the lithium/manganese ratio distribution in the spinel.

Figure 8:
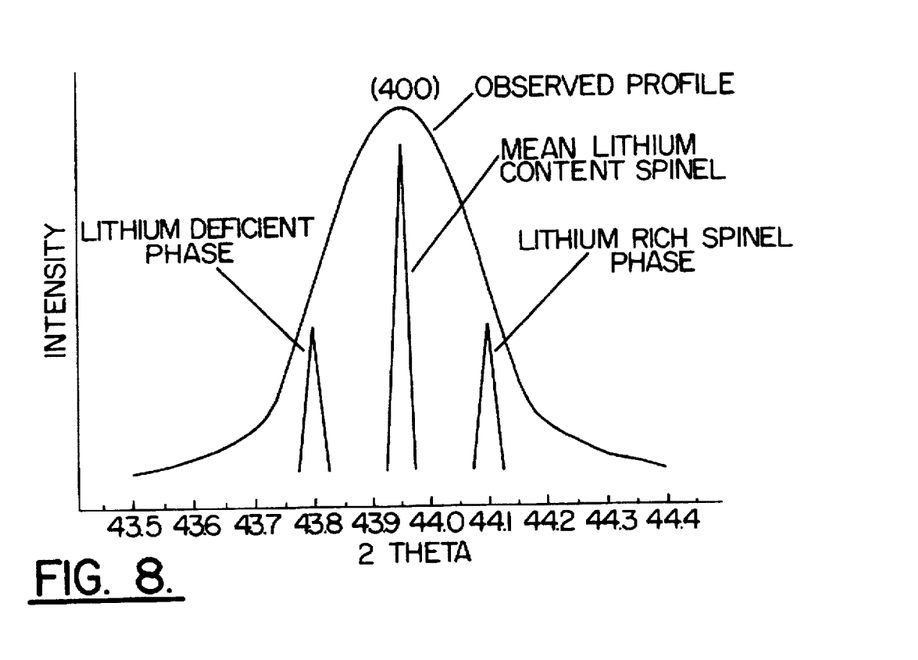
FIG. 8 is a diagram showing the concept of main lattice distortion in spinel $Li_{1+x}Mn_{2-x}O_4$ intercalation compounds.

FIG. 8 is a diagram illustrating the concept that broad x-ray diffraction profiles, such as the ones corresponding to the spinel compounds of the comparative examples, may be considered as phase distribution curves of lithium spinel Li$_{1+x}$Mn$_{2-x}$O$_4$ phases with different lithium/manganese ratios. The coexistence of the infinite sequences of high and low lithium content spinels with a general formula Li$_{1+x}$Mn$_{2-x}$O$_4$, wherein X can have an infinite numbers of values, is illustrated in FIG. 6. From the x-ray diffraction profiles displayed in FIGS. 5 and 7 as a function of lithium/ manganese ratio, it follows that the spinel Li$_{1+x}$Mn$_{2-x}$O$_4$ compounds with a broad full width at half maximum are most likely nonhomogeneous and can simultaneously contain considerably higher lithium content and lower lithium content spinel phases compared to the corresponding mean value spinel phases. In fact, during the firing process, spinels with lower lithium content than the stoichiometric ratio may be undesirably transformed into Mn$_2$O$_3$ and higher lithium content spinel phases by a disproportionation reaction. Analogously, the extremely high lithium content spinel phase may be undesirably transformed into Li$_2$MnO$_3$ and lower lithium content spinel phases by another disproportionation reaction. It is important to emphasize that both Mn$_2$O$_3$ and Li$_2$MnO$_3$ are not electrochemically active in the 4 V region and can exist in considerable amount as amorphous impurities in the final product. The existence of the Mn$_2$O$_3$ and Li$_2$MnO$_3$ impurities decrease both the specific capacity and the cycleability of the spinel Li$_{1+x}$Mn$_{2-x}$O$_4$ compound.

As illustrated herein, the full width at half maximum of the peaks of diffraction planes reflects to the lattice distortion, homogeneity, and impurity level of the spinel Li$_{1+x}$Mn$_{2-x}$O$_4$ compound. All of these parameters have a considerable impact on the spinel cycleability. The full width at half maximum values of the reflection (400) and (440) peaks are highly reproducible and thus may be used as a reference for spinel Li$_{1+x}$Mn$_{2-x}$O$_4$ electrochemical performance.

As described above, the spinel lattice distortion may be mainly due to random distortion caused by simultaneous existence of lithium rich and lithium poor spinel phases and can be decreased by increasing the homogeneity of the lithium/manganese distribution in the final product. The highly uniform lithium/manganese distribution in the final product of the present invention provides a spinel having high specific capacity and long cycling life.

Figure 9:
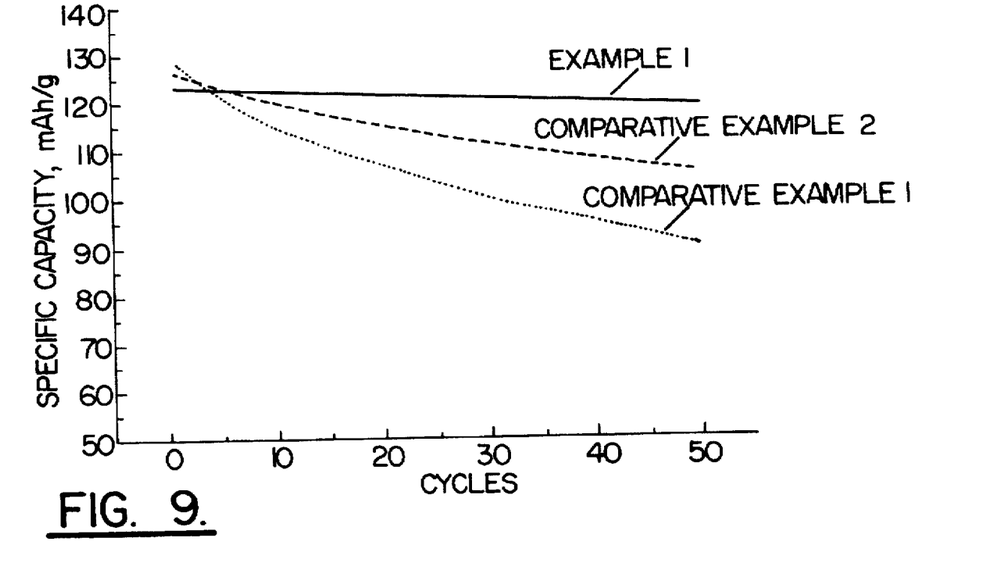
FIG. 9 is a graph illustrating the dependence of discharge specific capacities on the charge-discharge cycle numbers of the spinel $Li_{1+x}Mn_{2-x}O_4$ compound of the present invention and of the comparative examples.

FIG. 9 shows the dependence of discharge specific capacities on the charge-discharge cycle numbers of the spinel $Li_{1+x}Mn_{2-x}O_4$ compounds of Example 1 and the comparative examples. As shown in FIG. 9, spinel $Li_{1+x}Mn_{2-x}O_4$ intercalation compounds formed according to the present invention maintain their specific capacity after numerous cycles and therefore exhibit long cycling life.

It is understood that upon reading the above description of the present invention, one skilled in the art could make changes and variations therefrom. These changes and variations are included in the spirit and scope of the following appended claims.

That which is claimed:

1. A method of preparing a spinel $Li_{1+x}Mn_{2-x}O_4$ intercalation compound comprising:
    (a) mixing at least one manganese compound selected from the group consisting of manganese salts and manganese oxides with at least one lithium compound selected from the group consisting of lithium salts and lithium oxides;
    (b) firing the mixture from step (a) to a temperature of between about 400° C. and 500° C. in the presence of a gas flow with a flow rate of between about 0.5 l/gh and 5.0 l/gh to form an oxygen rich spinel;
    (c) firing the oxygen rich spinel from step (b) to a temperature of between 500° C. and 600° C. in the presence of a gas flow with a flow rate of between about 0.1 l/gh and 1.0 l/gh to form a distorted $Li_{1+x}Mn_{2-x}O_4$ spinel; and
    (d) firing the distorted spinel from step (c) to a temperature of between 700° C. and 800° C. in the presence of a gas flow with a flow rate of between about 0.005 l/gh and 0.2 l/gh to form an ordered stoichiometric $Li_{1+x}Mn_{2-x}O_4$ spinel.

2. The method according to claim 1 further comprising (e) cooling the ordered $Li_{1+x}Mn_{2-x}O_4$ spinel at a rate of greater than about 20° C. per hour in the presence of a gas flow with a flow rate of between about 0.0 l/gh and 1.0 l/gh.

3. The method according to claim 1 wherein the at least one manganese compound and the at least one lithium compound in step (a) are mixed in a lithium to manganese mole ratio of between about 1.02:2 and 1.1:2.

4. The method according to claim 1 wherein firing steps (b), (c), and (d) are performed consecutively without cooling of the spinel material between steps.

5. The method according to claim 1 wherein the firing temperature in step (b) is maintained for at least about four hours.

6. The method according to claim 1 wherein the firing temperature in step (c) is maintained for at least about ten hours.

7. The method according to claim 1 wherein the firing temperature in step (d) is maintained for at least about ten hours.

8. The method according to claim 1 wherein the at least one manganese compound is selected from the group consisting of $MnO_2$, $Mn_2O_3$, $Mn_3O_4$, $MnCO_3$, $MnSO_4$, $Mn(NO_3)_2$, $Mn(CH_3CO_2)_2$, or mixtures thereof.

9. The method according to claim 1 wherein the at least one lithium compound is selected from the group consisting of $Li_2O$, $LiOH$, $LiNO_3$, $Li_2CO_3$, $Li_2SO_4$, $LiNO_3$, $LiCH_3CO_2$, or mixtures thereof.

10. The method according to claim 1 wherein the gas in steps (b), (c), and (d) is selected from the group consisting of air and a gas mixture having an oxygen content of between about 5 and 100% oxygen by volume.

11. A product prepared according the method of claim 1.

12. A method of preparing a spinel $Li_{1+x}Mn_{2-x}O_4$ intercalation compound comprising:
    (a) mixing at least one manganese compound selected from the group consisting of manganese salts and manganese oxides with at least one lithium compound selected from the group consisting of lithium salts and lithium oxides;
    (b) firing the mixture from step (a) to a temperature of between about 400° C. and 500° C. for a first soak time of at least about four hours to form an oxygen rich spinel;
    (c) firing the oxygen rich spinel from step (b) to a temperature of between 500° C. and 600° C. for a second soak time of at least about ten hours to form a distorted $Li_{1+x}Mn_{2-x}O_4$ spinel; and
    (d) firing the distorted spinel from step (c) to a temperature of between 700° C. and 800° C. for a third soak time of at least about ten hours to form an ordered $Li_{1+x}Mn_{2-x}O_4$ spinel.

13. The method according to claim 12 wherein the mixture in step (b) is fired in the presence of a gas flow with a flow rate of between about 0.5 l/gh and 5.0 l/gh, the oxygen rich spinel in step (c) is fired in the presence of a gas flow with a flow rate of between about 0.1 l/gh and 1.0 l/gh, and the distorted $Li_{1+x}Mn_{2-x}O_4$ spinel is fired in the presence of a gas flow with a flow rate of between about 0.005 l/gh and 0.2 l/gh.

14. The method according to claim 13 wherein the gas in steps (b), (c), and (d) is selected from the group consisting of air and a gas mixture having an oxygen content of between about 5 and 100% oxygen by volume.

15. The method according to claim 14 further comprising (e) cooling the ordered $Li_{1+x}Mn_{2-x}O_4$ spinel at a rate of greater than about 20° C. per hour in the presence of a gas flow with a flow rate of between about 0 l/gh and 1.0 l/gh.

16. The method according to claim 15 wherein the at least one manganese compound and the at least one lithium compound in step (a) are mixed in a lithium to manganese mole ratio of between about 1.02:2 and 1.1:2.

17. The method according to claim 16 wherein firing steps (b), (c), and (d) are performed consecutively without cooling of the spinel material between steps.

18. The method according to claim 16 wherein the at least one manganese compound is selected from the group consisting of $MnO_2$, $Mn_2O_3$, $Mn_3O_4$, $MnCO_3$, $MnSO_4$, $Mn(NO_3)_2$, $Mn(CH_3CO_2)_2$, or mixtures thereof.

19. The method according to claim 16 wherein the at least one lithium compound is selected from the group consisting of $Li_2O$, $LiOH$, $LiNO_3$, $Li_2CO_3$, $Li_2SO_4$, $LiNO_3$, $LiCH_3CO_2$, or mixtures thereof.

20. A product prepared according the method of claim 12.

21. A method of preparing a positive electrode for an electrochemical cell comprising:
    (a) mixing at least one manganese compound selected from the group consisting of manganese salts and manganese oxides with at least one lithium compound selected from the group consisting of lithium salts and lithium oxides;
    (b) firing the mixture from step (a) to a temperature of between about 400° C. and 500° C. in the presence of a gas flow with a flow rate of between about 0.5 l/gh and 5.0 l/gh to form oxygen rich spinels;
    (c) firing the oxygen rich spinels from step (b) to a temperature of between 500° C. and 600° C. in the presence of a gas flow with a flow rate of between about 0.1 l/gh and 1.0 l/gh to form distorted $Li_{1+x}Mn_{2-x}O_4$ spinels;
    (d) firing the distorted $Li_{1+x}Mn_{2-x}O_4$ spinels from step (c) to a temperature of between 700° C. and 800° C. in the presence of a gas flow with a flow rate of between about 0.005 l/gh and 0.2 l/gh to form ordered $Li_{1+x}Mn_{2-x}O_4$ spinels;

(e) dispersing the ordered $Li_{1+x}Mn_{2-x}O_4$ spinels in a solvent with a conductive agent and a binder material to form a slurry;

(f) heating the slurry to evaporate the solvent to form a dry electrode;

(g) compressing the dry electrode; and (h) cutting the dry electrode to form a positive electrode for an electrochemical cell.

22. The method according to claim 21 further comprising cooling the ordered $Li_{1+x}Mn_{2-x}O_4$ spinel after step (d) at a rate of greater than about 20° C. per hour in the presence of a gas flow with a flow rate of between about 0 l/gh and 1.0 l/gh.

23. The method according to claim 21 wherein firing steps (b), (c), and (d) are performed consecutively without cooling of the spinel material between steps.

24. The method according to claim 21 wherein the firing temperature in step (b) is maintained for at least about four hours and the firing temperatures in steps (c) and (d) are each maintained for at least about ten hours.

25. A method of preparing a positive electrode for an electrochemical cell comprising:

(a) mixing at least one manganese compound selected from the group consisting of manganese salts and manganese oxides with at least one lithium compound selected from the group consisting of lithium salts and lithium oxides;

(b) firing the mixture from step (a) to a temperature of between about 400° C. and 500° C. for a first soak time of at least about four hours to form an oxygen rich spinel;

(c) firing the oxygen rich spinel from step (b) to a temperature of between 500° C. and 600° C. for a second soak time of at least about ten hours to form a distorted $Li_{1+x}Mn_{2-x}O_4$ spinel; and (d) firing the distorted spinel from step (c) to a temperature of between 700° C. and 800° C. for a third soak time of at least about ten hours to form an ordered $Li_{1+x}Mn_{2-x}O_4$ spinel;

(e) dispersing the ordered $Li_{1+x}Mn_{2-x}O_4$ spinels in a solvent with a conductive agent and a binder material to form a slurry;

(f) heating the slurry to evaporate the solvent to form a dry electrode;

(g) compressing the dry electrode; and (h) cutting the dry electrode to form a positive electrode for an electrochemical cell.

26. The method according to claim 25 further comprising cooling the ordered $Li_{1+x}Mn_{2-x}O_4$ spinel after step (d) at a rate of greater than about 20° C. per hour.

27. The method according to claim 25 wherein firing steps (b), (c), and (d) are performed consecutively without cooling of the spinel material between steps.

* * * * *

UNITED STATES PATENT AND TRADEMARK OFFICE
CERTIFICATE OF CORRECTION

PATENT NO. : 5,792,442
DATED : August 11, 1998
INVENTOR(S) : Manev et al.

It is certified that error appears in the above-identified patent and that said Letters Patent is hereby corrected as shown below:

On the title page, item [56],
Add the following References Cited:

--FOREIGN PATENT DOCUMENTS
    0 688 739 A1    12/1995    EPO
    GB 2 270 195 A    02/1994    Great Britain OTHER PUBLICATIONS
Synthesis and Characterization of $Li_{1+x}Mn_{2-x}O_4$ for Li-Ion Battery Applications; Gao et al.; <u>Journal of the Electrochemical Society</u>, vol. 143, no. 1 (January, 1996), pp. 100-114

Structural Aspects of Lithium-Manganese-Oxide Electrodes For Rechargeable Lithium Batteries; Rossouw et al.; <u>Mat. Res. Bull.</u>, vol. 25, no. 2, (February, 1990) pp. 173-182.

Characterizing $Li_{1+x}Mn_{2-x}O_4$ for Li-Ion Battery Applications; Gao et al., <u>1046b Extended Abstracts, Fall Meeting vol. 95/2 (1995) October 8/13</u>--.

Signed and Sealed this

Fifth Day of January, 1999

Attest:

*Attesting Officer*      *Acting Commissioner of Patents and Trademarks*